US005273620A

United States Patent [19]

Lamberti

[11] Patent Number: 5,273,620
[45] Date of Patent: Dec. 28, 1993

[54] METHOD OF AND MEANS FOR PROVIDING A COLORED DESIGN INLAY ON GRANITE OR MARBLE SURFACE

[76] Inventor: David E. Lamberti, P.O. Box 1054, Williamstown, Vt. 05679

[21] Appl. No.: 881,071

[22] Filed: May 11, 1992

[51] Int. Cl.[5] ........................ B44C 1/22; C03C 15/00; C03C 25/06

[52] U.S. Cl. .................................... 156/630; 156/153; 156/293; 156/299; 156/345; 156/633; 156/645; 156/657; 156/663

[58] Field of Search ............ 156/153, 293, 299, 303.1, 156/629, 630, 633, 645, 655, 657, 663, 345

[56] References Cited

U.S. PATENT DOCUMENTS

| | | | |
|---|---|---|---|
| 2,949,689 | 8/1960 | Vida | 156/299 |
| 3,179,729 | 4/1965 | Richardson | 156/659.1 X |
| 3,702,279 | 11/1972 | Fitzgerald | 156/303.1 X |
| 4,126,500 | 11/1978 | Palanos | 156/293 X |

*Primary Examiner*—William A. Powell
*Attorney, Agent, or Firm*—Thomas N. Neiman

[57] ABSTRACT

The method of providing colored design inlay on a granite or marble surface comprises the steps of: providing a stone surface; preparing the stone surface; providing colored glass particles; providing a liquid base adhesive; mixing the particles and adhesive; pouring the mixture onto the stone; allowing the mixture to harden; grinding and polishing the mixture; and, etching the finished product. The means comprises the colored glass particles and the liquid base adhesive along with the polishing and etching tools.

8 Claims, 2 Drawing Sheets

METHOD OF AND MEANS FOR PROVIDING A COLORED DESIGN INLAY ON GRANITE OR MARBLE SURFACE

This invention pertains to memorials and stone cutting operation methods and means, and in particular, to such methods and means that provide a colored design inlay on a granite or marble surface.

The user of tools to cut or etch designs in granite or marble stone for memorials or for the faces of buildings is well known in the United States. For the most part, putting these designs in the stone occurs as simply a design of the color of the particular stone. Effects to have different colors ingrained into the stone have failed. Currently, the most widely used method for creating color is to paint on the surface with a liquid material known as lithochrome. This material does not penetrate the stone and can be washed off with a solvent. It looks fine when initially done, but does not last and will not weather well. Many cemeteries will not allow this to be used.

The only other means used is regular etching which can only be done on black or a very dark colored stone. This gives one only a two color effect, the original color of the stone and the lighter color exposed (usually a lighter color) when the etching is done. What is needed is a method of providing a colored designed inlay on a granite or marble surface. What is also needed is the means of providing a colored design inlay on a granite or marble surface.

It is the object of this invention to teach a method of and means for providing a colored design inlay on a granite or marble surface which avoids the disadvantages and limitations, above recited which occur in previous stone design systems. Particularly, it is the object of this invention to teach a method for providing a colored design inlay on a granite or marble surface, for use by the memorial or stone cutting industry, comprising the steps of providing a stone for having a design place therein; preparing the stone by pre-sinking a design into the stone; providing a plurality of colored glass particles; providing a liquid base adhesive; mixing the colored glass particles and the liquid base adhesive into a completely mixed substance; pouring the mixture into the presunk area of the stone; grinding and polishing the mixture, when dried; and etching, as necessary, to create the finished design. Finally, it is the object of this invention to teach means for providing a colored design inlay on a granite or marble stone, for use by the memorial or stone cutting industry, comprising means for cutting a stone; colored glass particles; an adhesive means; said adhesive means comprising a liquid base adhesive; and etching means.

BRIEF DESCRIPTION OF THE DRAWINGS

Further objects and features of this invention will become more apparent by reference to the following description taken in conjunction with the following figures, in which.

Figure 1:
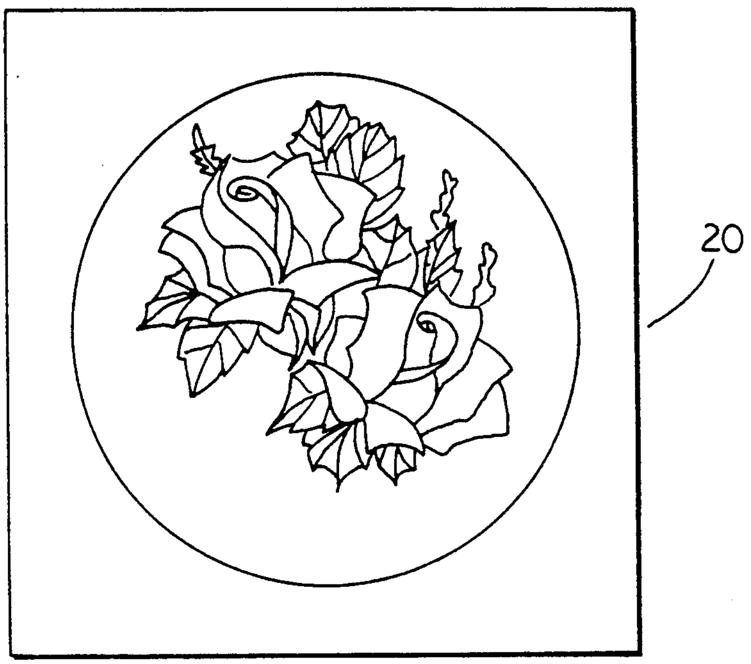
FIG. 1 is the frontal plan view of a finished design on a stone.
Figure 2:
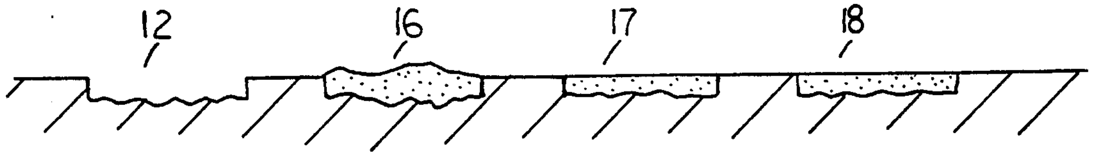
FIG. 2 is a side cross-sectional view if the steps involved in producing the finished design.
Figure 3:
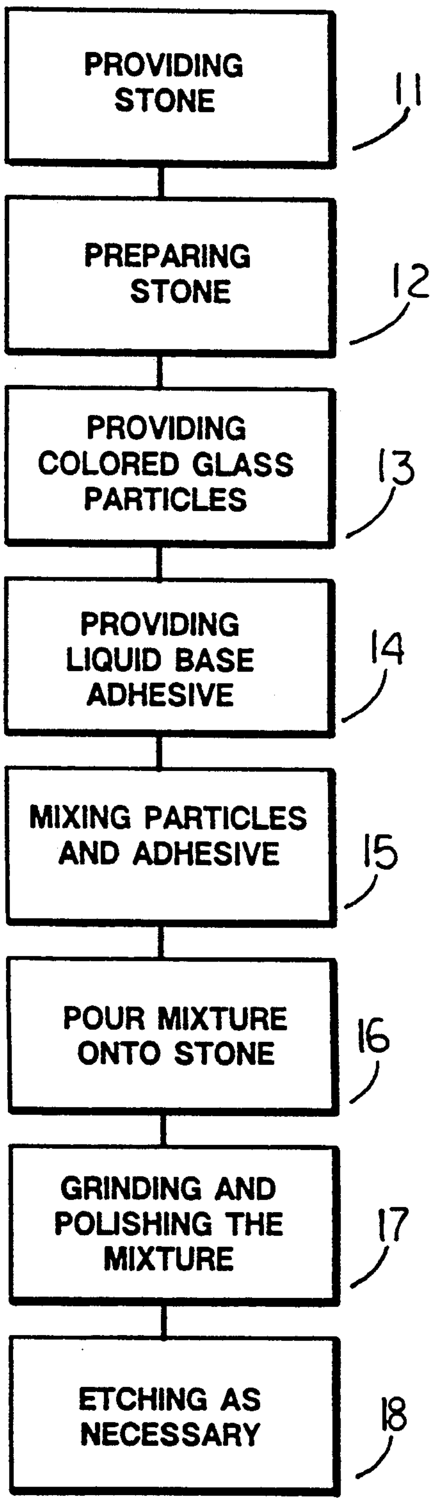
FIG. 3 is a chart showing the steps involved in providing a colored design inlay on a granite or marble stone surface.

As shown in the figures, the novel process consists of the following steps: providing a suitable stone 11 on which the design will be imprinted into; preparing the stone 12, which consists of cutting the design outline into the stone; providing colored glass particles 13-each different color desired will be separated; providing a liquid base adhesive 14; mixing each desired color and the liquid base adhesive 15 as a separate substance; pouring the mixture onto the stone 16 in the areas of the design which call for that color; grinding and polishing the mixture 17 after it hardens; and then etching the new colored surface 18 to highlight the design. Different color sections of the design would require steps 15, 16, 17 and 18 to be accomplished for each of the colors desired in the finished design.

As shown in FIG. 1, the designs using the colored inlays can result in very beautiful colored designs on a granite or marble surface 20. A gray stone can have design showing red flowers, green leaves and brown stems. The finished etching produces the delineation of the petal of the flower and the thin stems in the leaves. Once, the mixture is hardened, grinded and polished and the etching is finished, the finished surface is weather resistant and the colors are permanent. Therefor, memorial stones in cemeteries and designs on the outside walls of buildings will maintain their decorative colors. This all can be accomplished on any base color stone.

While I have described my invention in connection with specific embodiments thereof, it is clearly to be understood that this is done only by way of example and not as a limitation to the scope of my invention as set forth in the objects thereof and in the appended claims.

I claim:

1. A method of providing a colored design inlay on a granite or marble surface, for use by the memorial or stone cutting industry, comprising the steps of:

providing a stone for having a design placed therein;
preparing the stone by pre-sinking a design into the stone;
providing a plurality of colored glass particles;
providing a liquid base adhesive;
mixing the colored glass particles and the liquid base adhesive into a completely mixed substance;
pouring the mixture into the presunk area of the stone;
grinding and polishing the mixture, when dried; and
etching, as necessary, to create the finished design.

2. A method for providing a colored design inlay on a granite of marble surface, according to claim 1, wherein;

said providing a stone step comprises choosing a granite or marble stone of any color to be finished.

3. A method for providing a colored design inlay on a granite or marble surface, according to claim 1, wherein;

said mixing the colored glass particles and liquid base adhesive step comprises producing a substance that will adhere to a pre-determined area of the stone and will provide that area with a specific color.

4. A method for providing a colored design inlay on a granite or marble surface, according to claim 1, wherein;

said grinding and polishing the mixture step comprises allowing the mixture to harden prior to initiating this step.

5. Means for providing a colored design inlay on a granite or marble surface, for use by the memorial and stone cutting industry, comprising:

means for cutting a stone;

colored glass particles;

an adhesive means;

said adhesive means comprising a liquid base adhesive; and etching means.

6. Means for providing a colored design inlay on a granite or marble surface, according to claim 5, wherein:

said cutting means comprises means for sinking the design in the surface of said stone.

7. Means for providing a colored design inlay on a granite or marble surface, according to claim 5, wherein:

said colored glass particles comprise different glass particles for the different individual colors desired.

8. Means for providing a colored design inlay on a granite or marble surface, according to claim 5, wherein:

said etching means comprises means for cutting into said polished mixture to provide a finished design.

* * * * *